United States Patent [19]

Price et al.

[11] 4,166,524

[45] * Sep. 4, 1979

[54] CLOSURE FOR SILO DORMER

[75] Inventors: Raymond R. Price; Lawrence A. Olejnizak; Roger V. Olejnizak, all of Rochester, Minn.

[73] Assignee: Rochester Silo, Inc., Rochester, Minn.

[ * ] Notice: The portion of the term of this patent subsequent to Dec. 13, 1994, has been disclaimed.

[21] Appl. No.: 860,042

[22] Filed: Dec. 13, 1977

Related U.S. Application Data

[63] Continuation-in-part of Ser. No. 721,561, Sep. 8, 1976, Pat. No. 4,062,434.

[51] Int. Cl.$^2$ .................... B65G 65/36; E04H 7/22
[52] U.S. Cl. ........................................... 193/34
[58] Field of Search .............. 193/29, 34; 160/327, 160/354; 52/195, 196

[56] References Cited

U.S. PATENT DOCUMENTS

| | | | |
|---|---|---|---|
| 1,511,467 | 10/1924 | Heath | 52/195 X |
| 4,062,434 | 12/1977 | Price et al. | 193/34 |

FOREIGN PATENT DOCUMENTS

| | | | |
|---|---|---|---|
| 589463 | 11/1933 | Fed. Rep. of Germany | 52/196 |
| 1431011 | 4/1976 | United Kingdom | 160/354 |

*Primary Examiner*—Robert B. Reeves
*Assistant Examiner*—James L. Rowland
*Attorney, Agent, or Firm*—Williamson, Bains, Moore & Hansen

[57] ABSTRACT

An agricultural silo comprising a plurality of vertically spaced apart silage discharge orifices includes a double passage chute overlying the orifices. The chute includes a first passage permitting unobstructed operator access and a separate silage discharge passage which confines the silage during the unloading operation. A dormer door provided in the silo top may be opened to discharge silage therethrough into the silage discharge passage. When opened the door vents the silo and when closed the door prevents material from entering the climbing and discharge chute during silo filling and prevents updrafts in the chute during unloading. A frame affixed in a dormer space at the top of the silo and chute defines a dormer opening of substantially the same size as the discharge orifices for snug mounting of an unloading transfer conduit therein.

11 Claims, 4 Drawing Figures

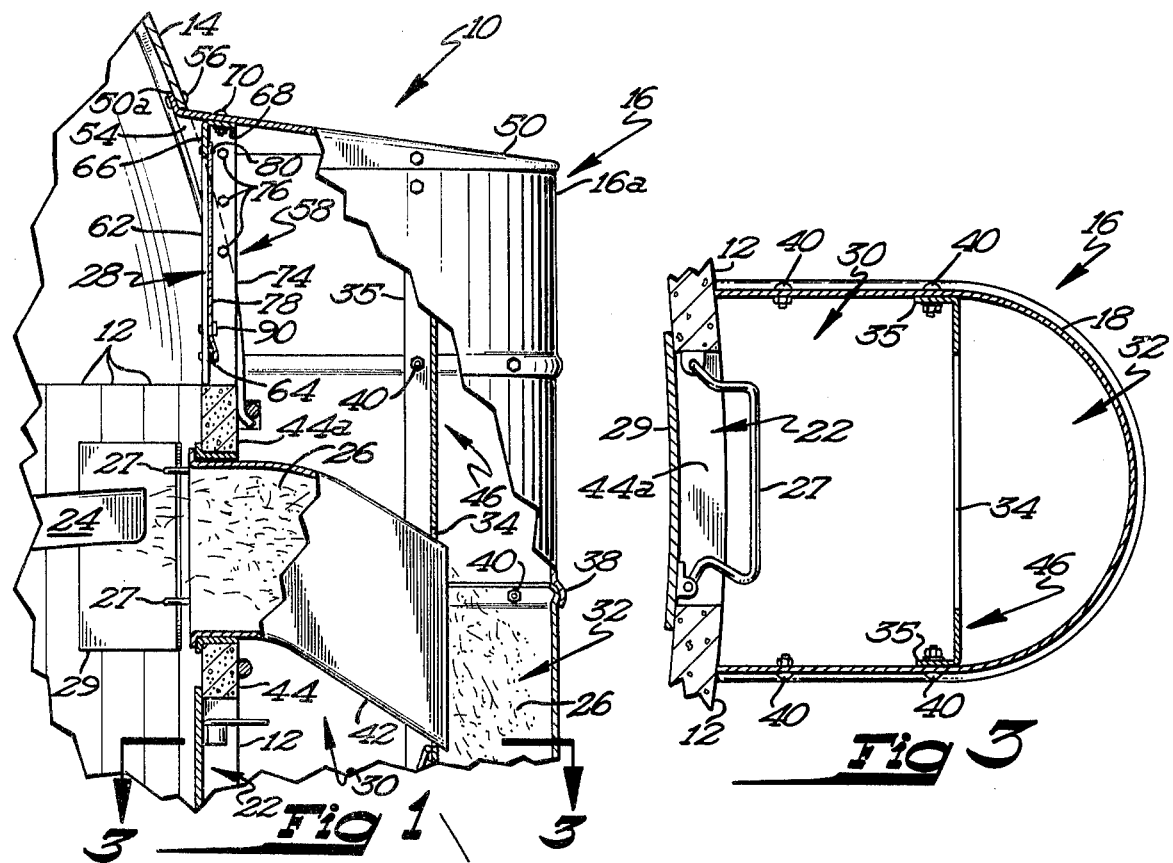
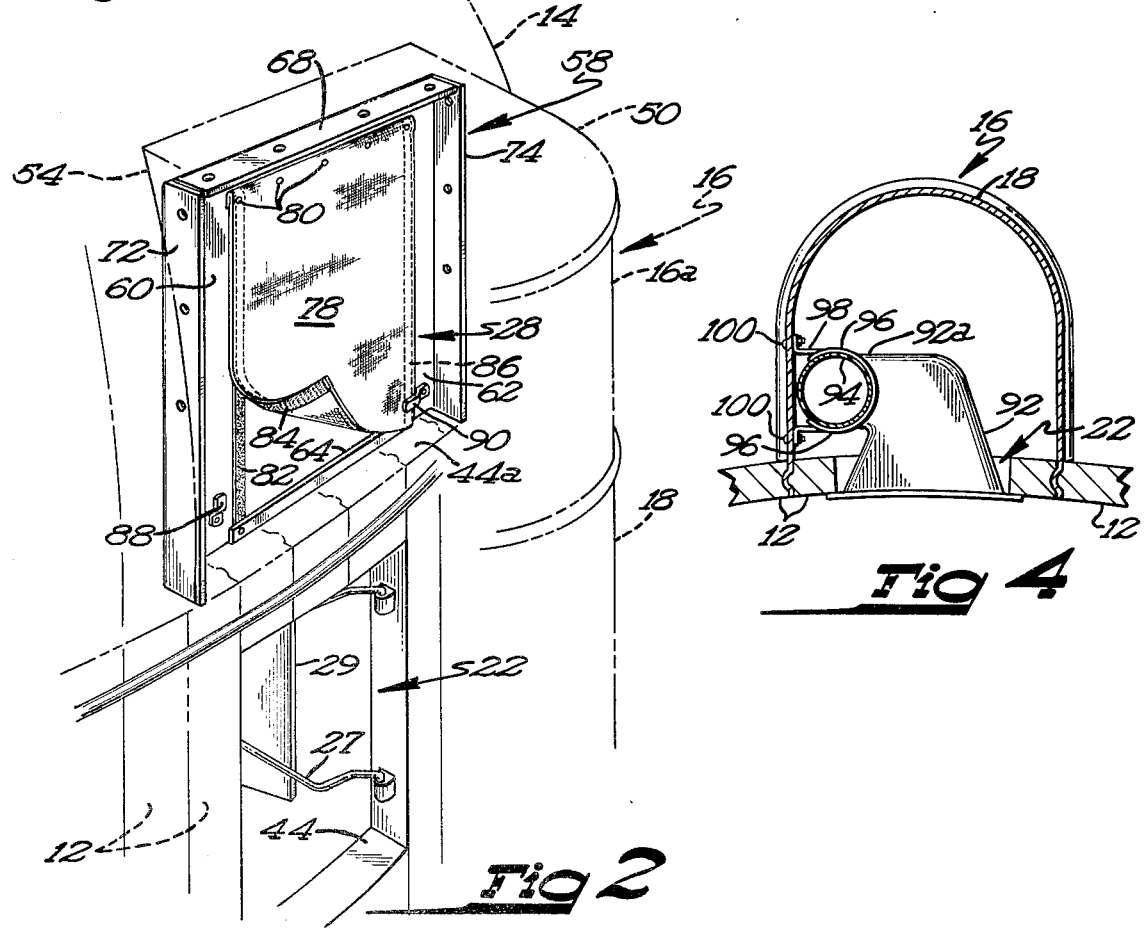

CLOSURE FOR SILO DORMER

BACKGROUND OF THE INVENTION

This invention relates generally to agricultural silos and is a continuation-in-part of copending application Ser. No. 721,561, filed Sept. 8, 1976, now U.S. Pat. No. 4,062,434. More particularly, the instant invention relates to silo construction characterized by a dormer door for minimizing unwanted air currents in the silage unloader chute and for preventing material from entering the chute during a silo loading operation.

As will be recognized by those skilled in the art, modern silos normally include a plurality of vertically spaced apart silage discharge openings defined in a wall thereof and an elongated, generally tubular silage discharge chute which abuts the silo and overlies the openings. In silos wherein a single passage chute is employed, the interior of the chute becomes dirty and grimy during the unloading operation. When the ladder rungs within the silo chute become grimy or slippery it can be difficult and inconvenient for the farmer to move within the chute. In order to remedy problems of this nature, silage chutes have been divided into separate access and silage discharge passageways. For example, in U.S. Pat. No. 3,709,345, issued Jan. 9, 1973, to the same assignee of the invention disclosed herein, the silage discharge chute is divided into an inner, access passageway and an outer silage discharge passageway which receives forage outputted from the silo. A plurality of door panels engagable to direct ensilage into the output passageway prevents contamination of the access passageway. In U.S. Pat. No. 3,797,625, issued Mar. 19, 1974, to the common assignee of the invention disclosed herein, the silage is contained within a separate discharge pipe housed within the access passageway to prevent contamination of same. Thus, with twin passage discharge chutes of the type described, silage being discharged from the silo is prevented from contaminating the interior of the access passageway.

As silage is discharged from the silo it will be directed downwardly through the chute's silage discharge passageway and out of the chute into a usually horizontally oriented silage handling device. Often an upward chimney draft will draw chaff and dust into the chute during unloading. When closed the dormer door will alleviate "chimney effect" draft problems of this nature. Thus, when employed in combination with a twin passageway silage discharge chute of the character described in the aforesaid patents, the dormer door will help to maintain the cleanliness of the access chute passageway.

The dormer door disclosed in our copending application identified above has been very effective in achieving the foregoing functions. The dormer door assembly disclosed herein offers further advantages in accommodating unloading from the top of the silo through the dormer and in avoiding interference with unloader apparatus operating inside of the silo.

SUMMARY OF THE INVENTION

The instant invention comprises a silo equipped with dormer door apparatus to facilitate selective flow communication between the interior of the top of the silo and the silage discharge chute.

In a preferred embodiment the silo is provided with a dormer door at an upper portion thereof which may be selectively opened by the operator to enable fluid flow communication between the upper silo interior and the silage discharge chute. The discharge chute includes an access passageway for permitting unobstructed access by the operator and a separate, isolated passageway for transmitting discharged silage as discussed in the previously cited patent references. As silage is continuously outputted from the silo, air currents may tend to flow upwardly through the access passageway, rather than through the discharge passageway if there is an open dormer. In this manner silage discharged downwardly through the chute discharge passageway will not be greatly affected by opposing air currents flowing upwardly therein. However, such updrafts in the access passage could undesirably carry chaff upwardly in the access passage due to "chimney effects" during unloading. Accordingly, the dormer door is normally utilized to block the dormer opening and prevent updrafts during unloading.

The dormer door may be opened or closed as desired by the operator through the manipulation of a hinged closure flap which is conveniently accessible on the outside of the dormer door assembly through the clean access chute. The door may be opened to discharge silage from the upper part of the silo when the silo is fully loaded. As silage level decreases silage will be outputted through lower silage discharge orifices and the dormer door will be closed to minimize the "chimney effect". When an empty silo is being filled the dormer door can be closed to prevent unwanted spillage or leakage of silage into the access passage of the chute.

Thus an important object of this invention is to remedy the hitherto deleterious effects of air currents occurring within prior art discharge chutes during silage unloading.

More particularly, an object of this invention is to provide a practicable means for neutralizing the "chimney effect" which can occur during unloading of a silo.

A still further object of this invention is to provide a system for selectively blocking the dormer opening into the discharge chute during silo filling.

Another object of this invention is to provide a silo with a dormer door which may be selectively actuated by the operator through means conveniently accessible from an access passage within the discharge chute interior.

Still another object of this invention is to provide a dormer door assembly which may be quickly and easily mounted on silos of conventional construction.

A still further object of this invention is to provide a dormer door of the character described which is ideally adapted for use with double passageway silo chutes.

A particularly advantageous feature of the dormer door assembly of this invention resides in the use of a door frame which may be readily installed in the dormer space adjacent the domed roof of a silo and which is sized to provide a dormer opening of substantially the same size as the silage discharge orifices therebelow. This permits the same transfer conduit of the type disclosed in the aforesaid United States patents to be quickly and effectively utilized to unload silage from the top of the silo into the discharge passage of a double passage silo chute.

As a further beneficial aspect of the dormer door assembly, a flexible flap is utilized to selectively open and close the dormer opening defined by the aforesaid door frame. Retainer means for the closure flap may be released from inside the dormer space at the top of the chute access passage, and the flap opened without any interference with unloading apparatus operating inside of the silo.

These and other objects and advantages of this invention, along with features of novelty appurtenant thereto, will appear or become apparent in the course of the following detailed description.

BRIEF DESCRIPTION OF THE DRAWINGS

In the following drawings which form a part of the specification and are to be construed in conjunction therewith, and in which like reference numerals have been employed throughout to indicate like parts in the various views:

FIG. 1 is a perspective view of a silo constructed in accordance with the teachings of this invention, with parts thereof broken away or shown in section for clarity;

FIG. 2 is an enlarged, perspective view of the dormer door apparatus taken from the exterior of the silo;

FIG. 3 is a sectional view of the apparatus taken generally through line 3—3 in FIG. 1; and FIG. 4 is a view similar to FIG. 3 and showing an alternative embodiment of a double passage silo chute.

DETAILED DESCRIPTION OF THE DRAWINGS

Referring now to the drawings, there is shown in FIG. 1 a silo 10 of generally vertically upright, tubular configuration. The silo may be comprised of a plurality of conventional staves 12 of tongue and groove construction arranged as will be recognized by those skilled in the art. Silo 10 comprises an upper, curved dome roof 14 of preferably metallic construction, and an elongated chute 16 which extends vertically upwardly along the side of the silo in overlying, surrounding relationship with respect to a plurality of vertically spaced apart silage discharge orifices 22 formed in the wall of the silo. Lower and upper horizontal staves or partition members 44 and 44a define the bottom and top of the discharge orifices 22. In FIG. 1 there is illustrated a discharge chute portion 24 of a conventional rotatable silo unloader employed to automatically discharge silage 26 into the discharge chute 16 through one of the discharge orifices 22. Dormer door apparatus 28 located at an upper location within silo 10 above the uppermost discharge orifice 22 may be either opened or closed as desired by the operator, as will later be discussed. Each silage discharge orifice door 29 must be opened prior to discharge of silage through orifices 22.

Chute 16 is preferably of dual passageway construction, comprising an access passageway 30 and a separate silage discharge passageway 32. Divider wall 34 within chute 16 separates same to define the two passageways 30 and 32, the outer extremity of discharge passage 32 being defined by outer curved wall segment 18 of chute 16. Wall 34 includes a right angled portion 35 which is rigidly attached to the chute braces 38 by bolts 40. During the unloading process a hood or transfer conduit 42 which is coupled to dividing wall 34 is deployed to isolate and conduct silage from the discharge orifices 22 to similar orifices provided in partition 34. In this manner silage directed outwardly from discharge orifice 22 will pass into discharge chute passageway 32 through an orifice 46 provided in the partition wall 34. It will thus be apparent that as silage is discharged, access passageway 30 will remain clean and free from the silage 26 being outputted from the apparatus. Thus ladder rungs 27, which provide access for the operator, will remain clean and free from contamination. Transfer conduit 26 may be removably inserted within each of the discharge orifices 22 in a relatively snug fit therewith to place the interior of silo 10 in fluid flow communication with discharge passage 32. As the silage level drops and the unloading apparatus, including discharge chute 24, is lowered, transfer conduit 42 is moved to progressively lower discharge orifices 22. Chute 16, including the separate access and discharge passageways, may be constructed in accordance with the teachings of U.S. Pat. No. 3,709,345, issued Jan. 9, 1973, and/or U.S. Pat. No. 3,797,625, issued Mar. 19, 1974, both owned by the same assignee as in the instant case. The aforementioned patent references are relied upon and specifically incorporated by reference to show the detailed construction of the chute portion 16 discharge passage and transfer conduit also employed herein.

As will be recognized by those skilled in the art, as the silage level within silo 10 continuously decreases during unloading, a chimney effect will often occur, resulting in air currents or updrafts. The dormer door apparatus 28 (FIGS. 1 and 2) is provided to help control turbulent air currents, and is preferably located at an upper location within the silo. The dormer door apparatus generally indicated by reference numeral 28 is mounted within a dormer at the top of the silo assembly. The dormer is defined by vertical extension 16a on the upper end of silo chute 16, the side walls of which merge with the curvilinear, domed roof 14 of the silo along arcuate lines 54 defining a dormer aperture. The dormer space within the upper end 16a of chute 16 is closed on top by a dormer roof cap 50, the dormer space being indicated by reference numeral 52 in FIG. 1. The inner end of dormer roof cap 50 is formed to provide a flange 50a which is affixed to the silo roof dome on the top edge of dormer aperture 54 by fasteners 56, or other suitable means.

The dormer access aperture 54 is closed by a door assembly generally indicated by reference numeral 28. The door assembly is comprised of a frame structure 58, which is preferably sheet metal, but which may be made out of any suitable rigid material. Door frame 58 is comprised of a pair of upright, side frame members 60 and 62 which are laterally spaced apart, and a pair of vertically spaced cross frame members 64 and 66. These four frame elements combine to define a dormer opening of predetermined size. For reasons hereinafter set forth, the dormer opening so defined is the same width, and preferably the overall same size as silo discharge orifices 22. Bottom cross member 64 which connects the bottom ends of upright, side frame members 60 and 62, is preferably a metal strip. Top cross frame member 66 extends generally horizontally, and is bent along its length to form a horizontal mounting flange 68. Mounting flange 68 is bent to conform to the angle of inclination of dormer roof cap 50 and is affixed thereto by fasteners 70 as indicated in FIG. 1. Upright side frame members 60 and 62 are also bent along their length to form a pair of side mounting flanges 72 and 74. These upright side flanges are positioned to abut against opposed side wall segments of upper extension 16a of silo chute 16 and are attached thereto by means of fasteners 76.

It will thus be seen that door frame 58 is mounted in a generally upright position within the dormer space 52 across dormer aperture 54. As appears most clearly in FIG. 1, the dormer opening defined by frame 58 lies in a generally vertical plane extending across arcuate dormer aperture 54 and intersecting the plane of dormer roof cap 50. With the bottom ends of upright side frame members 60 and 62 resting on horizontal silo wall partition or stave 44a, a portion of the lower end of door frame 58 will lie inside of the arcuate extent of dormer aperture 54. Hence, fasteners 76 are located primarily on the upper ends of side mounting flanges 72, 74 where they will extend into side wall portions of upper chute or dormer segment 16a outside of dome shaped silo roof 14.

The dormer opening defined by door frame members 60, 62 and 64, 66 is normally closed by a door member which preferably takes the form of a flexible closure flap 78. Flap 78 preferably is made of plastic reinforced canvas. Along its upper end, flap 78 is attached to upper, cross frame member 66 by spaced fasteners 80 to form a hinged connection therewith. Vertically extending closure flap 78, being made of flexible material, may therefore be raised and lowered between open and closed positions along the hinge line defined by its attachment to the upper frame cross member 66. In order to ensure that closure flap 78 will stay tightly closed in sealing engagement with the periphery of the dormer opening defined by door frame 58, retainer means are provided on the outside face of the door frame assembly 58, within dormer space 52 and outside of silo 10. Preferably, such retaining means comprises a pair of Velcro strips 82 and 83 affixed to upright side frame members 60 and 62 and extending vertically thereon. Only one of the Velcro latch strips 82 is shown in FIG. 2 with respect to the partially open closure flap 78. Mating latch strips 84 and 86 are provided on the vertically extending side edges of closure flap 78. Thus, when flap 78 is dropped to a closed position, it will be tightly retained over the dormer opening by the aforesaid Velcro locking or latch strips. To ensure that the bottom end of closure flap 78 will be tightly retained over the dormer opening, and not be blown open by the unloader apparatus or by air currents passing in and out of the silo, closure flap 78 is of sufficient length that its bottom end overlaps the outside face of bottom cross member 64 of the frame assembly. Pivotal latches 88 and 90 secured to the lower ends of upright side frame members 60 and 62 may be swung into closing positions over the bottom, outside face of closure flap 78 to hold it tightly against bottom cross members 64. Bottom latch 88 is shown pivoted to its open position in FIG. 2, and latch 90 is shown swung to its horizontal, closing position over the bottom end of closure flap 78.

When filling the silo, dormer closure flaps 78 should be closed to prevent escape of silage into the adjacent discharge chute, and particularly to avoid the flow of silage into access passage 30. The dormer door can be quickly opened to discharge silage from the upper confines of the silo, or to vent the silo when not loading or unloading. However, when silage is discharged through the lower silo discharge orifices 22, the dormer closure flap 78 should be shut to prevent or minimize deleterious drafts caused by the chimney effect. Importantly, because of the disclosed construction of the dormer door apparatus, a farmer can quickly and conveniently adapt the silo for the situation at hand.

To open the dormer door, a farmer need only ascend access passage 30, utilizing ladder rungs 27. A farmer can then reach into dormer space 52 and swing pivot latches 88 and 90 to their vertical, unlocked positions. Closure flap 78 can then be pulled open by simply gripping the bottom end and pulling it upwardly. This will have an unzipping effect on the Velcro latches 82, 84 and 83, 86. If the silo is full and unloading is desired from the top end of the silo, transfer duct or conduit 42 can be moved into position inside the domed roof of the silo and inserted through the dormer opening designed by door frame 58. The transfer duct will hold closure flap 78 in an upwardly disposed, open position. Since the dormer opening defined by the inside edges of frame members 60, 62 and 64, 66 is substantially the same size as discharge orifices 22, transfer duct 42 will fit snuggly therewithin. This eliminates the need for any special blocking or attachment means for holding the transfer duct within the dormer opening. Transfer duct 42 will direct silage into outer, silage discharge passage 32 the same as it does when utilized in the lower, discharge orifices 22. Because closure flap 78 is flexible, and is folded to an open position on the outside silo dome 14, within dormer space 52, it will not interfere in any way with unloading apparatus operating within the top of the silo. It is possible that this could be a problem with a silo dormer door adapted to swing inwardly into the silo, as disclosed in applicants' copending application identified above. When transfer duct 42 is removed from the door opening and placed through one of the lower discharge orifices 22, closure flap 78 will drop downwardly to its closed position over the dormer opening and be retained by the aforesaid Velcro latch strips. The farmer may then swing pivot latches 88 and 90 to their horizontal, closed positions across the bottom end of closure flap 78 to ensure that it will stay closed. This dormer door closing operation, including the manipulation of pivot latches 88, 90 may be accomplished from access passage 30. The Velcro strips and pivot latches 88, 90 serve as detachable retaining means, advantageously positioned on the outside face of door frame 58 within dormer space 52 for ease of manipulation from within access passage 30.

In FIG. 4 we have shown a modified version of a transfer conduit and double passage silo chute system. This version is very similar to that disclosed in the aforesaid U.S. Pat. No. 3,797,625. However, the vertical pipe 94 forming the silo discharge passage is located to one side of silo chute 16 as clearly appears in FIG. 4. Transfer duct or conduit 92 having a hood-like receiving end as shown is abutted against the inside face of one of the discharge orifices 22. The outer end of transfer duct 92 is angled sideways to provide a laterally extending duct extension 92a for directing silage into discharge pipe 94. The outer end of transfer duct extension 92a is mounted around discharge pipe 94 by means of a coupling sleeve segment 96 in overlying relation to an opening in the side wall of pipe 94. This coupling arrangement of the transfer duct to a silage discharge pipe is the same as that disclosed in the aforesaid U.S. Pat. No. 3,797,625. Discharge pipe 94 is secured to a side wall segment of silo chute 16 by means of an arcuate bracket 98. Bracket 98 extends around discharge pipe 94 and is attached to a side wall segment of silo chute 16 by fasteners 100. The advantage of this particular discharge pipe and transfer conduit arrangement is that by having the discharge pipe mounted along one side of silo chute 16, more space is left within the silo chute for the clean, access passage and the discharge passage offers less interference to farmers ascending and descending the access passage by utilizing ladder rungs 27.

It is understood that certain features and sub-combinations disclosed herein are of utility and may be employed without reference to other features and sub-combinations. This is contemplated by and is within the scope of the claims. It is anticipated that various changes may be made in the size, shape and construction of the silo apparatus disclosed herein without departing from the spirit and scope of the invention as defined by the following claims.

What is claimed is:

1. An improved silo assembly comprising:

a vertically upright silo of tubular configuration;

a plurality of vertically spaced apart discharge orifices in said silo through which silage may be discharged;

an elongated, generally U-shaped chute extending vertically upwardly along said silo in overlying relationship with respect to said discharge orifices;

means defining an access passageway and a separate silage discharge passageway within said chute;

means for selectively permitting passage of discharged silage from different levels within said silo to said separate silage discharge passageway;

a dormer at the top of said chute defined by a vertical extension of said chute and a roof cap extending thereover;

a dormer opening in the top of said silo above the uppermost one of said discharge orifices and communicating with the space inside of said dormer; and door means overlying said dormer opening, said door means comprising a flexible closure flap in sealing engagement with the periphery of said door opening, hingedly attached to one peripheral side of said dormer opening and detachably secured along at least one other side thereof, said closure flap being detachable for the opening thereof from inside said access passageway.

2. An improved silo assembly as defined in claim 1 wherein:

said door means further comprises a frame within the space inside of said dormer defining said dormer opening; and retaining means on the outside of said frame inside of said dormer space detachably securing said closure flap to said frame exteriorly of said silo.

3. An improved silo assembly as defined in claim 2 wherein:

said dormer opening is substantially the same size as said discharge orifices.

4. An improved silo assembly as defined in claim 2 wherein:

said frame is oriented in a generally upright position and is comprised of two vertically spaced cross members and two laterally spaced, upright side members defining said dormer opening;

said closure flap is hingedly attached along the top thereof to the uppermost one of said cross members and the sides of said closure flap are detachably secured to said upright side members of said frame by said retaining means.

5. An improved silo assembly as defined in claim 4 wherein:

said retaining means comprises mating Velcro latching surfaces on said upright side members of said door frame and on the side edges of said closure flap.

6. An improved silo assembly comprising:

a vertically upright silo of tubular configuration;

a plurality of vertically spaced discharge orifices in said silo through which silage may be discharged;

an elongated, generally U-shaped chute extending vertically upwardly along said silo in overlying relation to said discharge orifices;

means defining a vertically extending access passage and a separate, vertically extending discharge passage within said chute, said discharge orifices being located within the confines of said access passage;

transfer conduit means extending between said discharge passage and one of said discharge orifices, said transfer conduit means being selectively movable into restraining engagement with any one of said discharge orifices in a snug fit therewith to permit transferring silage from different vertical levels within said silo into said discharge passage;

a dormer at the top of said chute defined by a vertical extension of said chute and a roof cap extending thereover;

a door frame within the space inside of said dormer defining a dormer opening in the top of said silo above the uppermost one of said discharge orifices and communicating with said dormer space, said dormer opening lying in a plane intersecting said dormer roof cap and being of such a size that said transfer conduit means may be mounted therein in close fitting relation with the periphery of said dormer opening, whereby silage may be unloaded from the top of said silo into said discharge passage through said dormer opening; and door means over said dormer opening in sealing relation thereto, said door means being movable to an open position from within said access passage.

7. An improved silo assembly as defined in claim 6 wherein:

said dormer opening is substantially the same size as said discharge orifices.

8. An improved silo assembly as defined in claim 6 wherein:

said silo has a curved, dome shaped roof with an aperture in an arcuate portion thereof; and said door frame is oriented in a generally upright position across said aperture, said door frame having a generally horizontal top frame member secured to said dormer roof cap.

9. An improved silo assembly as defined in claim 8 wherein:

said door frame further includes two generally upright, laterally spaced side frame members secured to opposite side portions of said vertical extension of said chute.

10. An improved silo assembly as defined in claim 8 wherein:

said door means comprises a flexible closure flap in sealing engagement with said door frame around the periphery of said dormer opening.

11. An improved silo assembly as defined in claim 10 wherein:

said closure flap is hingedly attached to said door frame along one side of said dormer opening and is detachably secured to said door frame along opposed sides of said dormer opening extending normal to said one side thereof by releasable retainer means on the outside of said frame inside of the space within said dormer.

* * * * *